United States Patent
Golub et al.

(10) Patent No.: US 9,013,691 B2
(45) Date of Patent: Apr. 21, 2015

(54) SNAPSHOT SPECTRAL IMAGING BASED ON DIGITAL CAMERAS

(71) Applicants: Michael Golub, Rehovot (IL); Menachem Nathan, Tel Aviv (IL); Amir Averbuch, Tel Aviv (IL); Asaf Kagan, Herzliya (IL); Valery Zheludev, Tel-Aviv (IL); Roman Malinsky, Holon (IL)

(72) Inventors: Michael Golub, Rehovot (IL); Menachem Nathan, Tel Aviv (IL); Amir Averbuch, Tel Aviv (IL); Asaf Kagan, Herzliya (IL); Valery Zheludev, Tel-Aviv (IL); Roman Malinsky, Holon (IL)

(73) Assignee: Ramot at Tel-Aviv University, Tel Aviv (IL)

( * ) Notice: Subject to any disclaimer, the term of this patent is extended or adjusted under 35 U.S.C. 154(b) by 136 days.

(21) Appl. No.: 13/752,560

(22) Filed: Jan. 29, 2013

(65) Prior Publication Data
US 2013/0194481 A1 Aug. 1, 2013

Related U.S. Application Data

(60) Provisional application No. 61/591,936, filed on Jan. 29, 2012.

(51) Int. Cl.
| | |
|---|---|
| G01J 3/28 | (2006.01) |
| H04N 9/04 | (2006.01) |
| G01J 3/02 | (2006.01) |
| G01J 3/18 | (2006.01) |
| G01J 3/36 | (2006.01) |

(52) U.S. Cl.
CPC ............. *H04N 9/045* (2013.01); *G01J 3/0205* (2013.01); *G01J 3/18* (2013.01); *G01J 3/2823* (2013.01); *G01J 3/36* (2013.01); *G01J 3/0208* (2013.01)

(58) Field of Classification Search
USPC .................................... 356/300–334
See application file for complete search history.

(56) References Cited

U.S. PATENT DOCUMENTS

| | | | |
|---|---|---|---|
| 6,522,403 B2 | 2/2003 | Wilson et al. | |
| 7,092,088 B2 | 8/2006 | Schau | |
| 7,283,231 B2 | 10/2007 | Brady et al. | |
| 8,081,244 B2 | 12/2011 | Golub et al. | |
| 2013/0016284 A1 | 1/2013 | Mestha et al. | |

OTHER PUBLICATIONS

Wagadarikar et al. Single disperser design for coded aperuture snapshot spectral imaging, 2008, Applied Optics, vol. 47, pp. 1-5.*
Chengbo Li et al., "A Compressive Sensing and Unmixing Scheme for Hyperspectral Data Processing", jIEEE Transactions on Image Processing, Mar. 2012, pp. 1200-1210, vol. 21, No. 3.

(Continued)

*Primary Examiner* — Abdullahi Nur
(74) *Attorney, Agent, or Firm* — Nathan & Associates Patent Agents Ltd.; Menachem Nathan

(57) ABSTRACT

Snapshot spectral imagers comprise an imaging lens, a dispersed image sensor and a restricted isometry property (RIP) diffuser inserted in the optical path between the source image and the image sensor. The imagers are used to obtain a plurality of spectral images of the source object in different spectral bands in a single shot. In some embodiments, the RIP diffuser is one dimensional. An optional disperser may be added in the optical path, to provide further dispersion at the image sensor. In some embodiments, all imager components except the RIP diffuser may be part of a digital camera, with the RIP diffuser added externally. In some embodiments, the RIP diffuser may be included internally in a digital camera.

16 Claims, 11 Drawing Sheets

(56) References Cited

OTHER PUBLICATIONS

Wotao Yin et al., "Bregman Iterative Algorithms for Minimization with Applications to Compressed Sensing", Siam J. Imaging Sciences, 2008, pp. 143-168, vol. 1, No. 1.

Jian-Feng Cai et al., "Split Bregman Methods and Frame Based Image Restoration", Siam J. Multiscaie Modeling and Simulation. 2009, pp. 337-369, vol. 8, No. 2.

Amir Averbuch, Pekka Neittaan, Valery Zheludev, "Periodic discrete-time frames: Design and applications for image restoration", submitted to the Siam J. on Imaging Sciences, 2012.

Amir Averbuch, Pekka Neittaan, Valery Zheluden, "Spline-based frames in the space of periodic signals", submitted to Inverse Problems and Imaging; 2012.

Ashwin Wagadarikar et al., "Single disperser design for coded aperture snapshot spectral imaging", Applied Optics, Apr. 1, 2008, pp. B44-B51, vol. 47, No, 10.

Rebecca M. Willett et al., "Compressed sensing for practical optical imaging systems: a tutorial", Optical Engineering, Jul. 2011, pp. 072601-1-072601-13, vol. 50, No. 7.

M. E. Gehm et al., "Single-shot compressive spectral imaging with a dual-disperser architecture", Optics Express, Oct. 17, 2007, pp. 14013-14027, vol. 15, No. 21.

Henry Arguello et al.,"Fast lapped block reconstructions in compressive spectral imaging", Applied Optics, Apr. 1, 2013, pp. D32-D45, vol. 52, No. 10.

Tom Goldstein et al., "The Split Bregman Method for L1 Regularized Problems", Siam J. Imaging Sci., 2009. pp. 323-343,vol. 2, No. 2.

Emmanuel Candes et al., "Robust Uncertainty Principles: Exact Signal Reconstruction from Highly Incomplete Frequency Information", IEEE Trans. Information Theory, 2005, pp. 469-509, vol. 52, No. 2.

Amir Averbuch et al., "Biorthogonal Butterworth Wavelets Derived from Discrete Interpolatory Splines", IEEE Transactions on Signal Processing, Nov. 2001, pp. 2682-2692, vol. 49, No. 11.

Stanley Osher et al., "Fast Linearized Bregman Iteration for Compressive Sensing and Sparse Denoising", Communications in Mathematical Sciences, 2010, pp. 93-111, vol. 8, No. 1.

Wotao Yin et al., "Practical compressive Sensing with Toeplitz and Circulant Matrices", Prod. SPIE 7744, Visual Communications and Image Processing 2010, 77440K (Jul. 14, 2010); doi:10 1117/12. 863527.

Richard Baraniuk et al., "A Simple Proof of the Restricted Isometry Property for Random Matrices", Constructive Approximation, 2008, pp. 253-263, vol. 28, No. 3.

D.L. Donoho, "Compressed Sensing", IEEE Trans. Information Theory, 2008, pp. 1289-1306, vol. 53, No. 4.

* cited by examiner

SNAPSHOT SPECTRAL IMAGING BASED ON DIGITAL CAMERAS

CROSS REFERENCE TO RELATED APPLICATIONS

This application is related to and claims priority from U.S. Provisional Patent Application No. 61/730,570 titled "Snapshot Spectral Imaging" and filed Jan. 29, 2012, which is incorporated herein by reference in its entirety.

FIELD

Embodiments disclosed herein relate in general to spectral imaging (SI) apparatus, systems and methods and in particular to snapshot ("single shot") spectral imaging (SSI) performed with digital cameras.

BACKGROUND

Snapshot spectral imagers are known. Such imagers perform simultaneous (instantaneous) acquisition of spatial and spectral data in a single snapshot. The data acquired forms a "spectral cube" (also referred to as "data cube") of a source object (also referred to simply as "object" or "scene"). A spectral cube includes light intensity data in two spatial dimensions and one spectral dimension and is expressed as a three-dimensional (3D) matrix. An advanced SSI system based on a regular digital camera and a 1D disperser inserted in the optical path between an imaged object and the camera sensor chip is disclosed in U.S. Pat. No. 8,081,244, which is incorporated herein by reference in its entirety. Some embodiments disclosed therein further include a blurring element. U.S. Pat. No. 8,081,244 also provides additional background information.

Known snapshot SI designs are based exclusively on computed tomography spectral imaging (CTIS) designs, which use one of two disperser types: a rotating disperser (prism or grating), or a two-dimensional (2D) grating disperser (e.g. in U.S. Pat. Nos. 6,522,403 and 7,092,088). Disadvantages of CTIS imagers include complicated and expensive optical set-ups with high quality relay optics, some requiring moving parts, the need to process and output huge spectral cubes, an inherent "missing cone" problem in data processing, a lack of miniaturization leading to relatively large sizes, and high cost.

Compressed sensing (CS) based spectral imaging is also known. One CS-SI approach uses a single pixel camera which incorporates a digital micro-mirror array (DMD) driven by pseudo random patterns and a single spectrometer (C. Li et al., IEEE Transactions on Image Processing, Vol. 21(3), pp. 1200-1210, 2012). Other approaches employ variants of "coded aperture snapshot spectral imaging" (CASSI). CASSI uses modulation of an image with a coded aperture and dispersive elements. CASSI variants include a single-shot compressive spectral imager having a dual-disperser architecture (DD CASSI), or a single disperser design (SD CASSI). A more recent approach, referred to as random convolution snapshot spectral imaging (RCSSI), is based on focal plane array measurements of spectrally dispersed coherent sources that have been randomly convoluted by two spatial light modulators. RCSSI requires coherent illumination, which restricts the imaging system considerably.

The known solutions to the problem of acquiring a full spectral cube in a snapshot involve much more complex and expensive hardware that that of a regular digital camera. Moreover, these solutions cannot be miniaturized. There is a therefore a need for, and it would be advantageous to have snapshot spectral imagers based on digital cameras, without any (or with just minimal) hardware changes to the cameras. It would be further advantageous to have such imagers miniaturized.

SUMMARY

In various embodiments there are disclosed methods and apparatus for SSI based on compressed sensing principles. An apparatus disclosed herein is a snapshot spectral imager. Thus, "apparatus for SSI" and "snapshot spectral imager" are used interchangeably. Although focused on spectral imaging of a source object, methods and apparatus disclosed herein can also be applied to gray or colored images. "Spectral images" or "spectral imaging" also refers to multispectral and hyperspectral images (or imaging). Methods and apparatus disclosed herein enable simultaneous capture of the spectral and spatial data stored in a 3D spectral cube of the source object of size M×N×L (where M and N are spatial dimensions L is a spectral dimension) using essentially a digital camera with a single added optical element—a "restricted isometry property (RIP) diffuser". The RIP diffuser, defined and described in detail below, is inserted in the optical path between source object and image sensor. In some embodiments, the RIP diffuser is 1D. The digital camera may be any camera (for example a regular digital camera, a digital SLR camera, a mobile (cell) phone camera, a capsule endoscope camera, a video camera, etc.) having a 2D image sensor (e.g. of CMOS or CCD type) of size H×V where M×N×L≤H×V. As used herein, a "dispersed image" refers to a diffusely-dispersed image created by an optical system with the RIP diffuser and obtained at a dispersed image sensor. The dispersed image sensor may occupy part of the regular 2D camera image sensor or be a separate image sensor. A second optical element, a 1D or 2D disperser, may be optionally added in the optical path. A CS-based mathematical algorithm is provided and used for reconstruction of the spectral cube from a 2D dispersed image.

In an embodiment, there is provided a snapshot spectral imager for obtaining spectral images of a source object comprising an imaging lens, a dispersed image sensor, and a RIP diffuser inserted in an optical path between the source object and the dispersed image sensor, wherein the snapshot spectral imager is configured to obtain at the dispersed image sensor a dispersed image formed through the imaging lens and the RIP diffuser, and wherein the snapshot spectral imager is further configured to process the dispersed image to provide a plurality of spectral images of the source object.

In an embodiment there is provided a method for snapshot spectral imaging of a source object comprising the steps of providing an imager comprising an imaging lens, a dispersed image sensor and a RIP diffuser inserted in an optical path between the object and the dispersed image sensor, obtaining at the dispersed image sensor a dispersed image formed through the imaging lens and the RIP diffuser, and processing the dispersed image to provide a plurality of spectral images of the source object.

In an embodiment there is provided a snapshot spectral imager for obtaining spectral images of a source object, comprising a digital camera which includes a dispersed image sensor, and a RIP diffuser inserted in an optical path between the source object and the dispersed image sensor, wherein the digital camera is configured to process a dispersed image obtained from the source image at the dispersed image sensor into a plurality of spectral images of the source object.

BRIEF DESCRIPTION OF THE DRAWINGS

Aspects, embodiments and features disclosed herein will become apparent from the following detailed description when considered in conjunction with the accompanying drawings. Like elements may be numbered with like numerals in different figures.

DETAILED DESCRIPTION

Figure 1A:
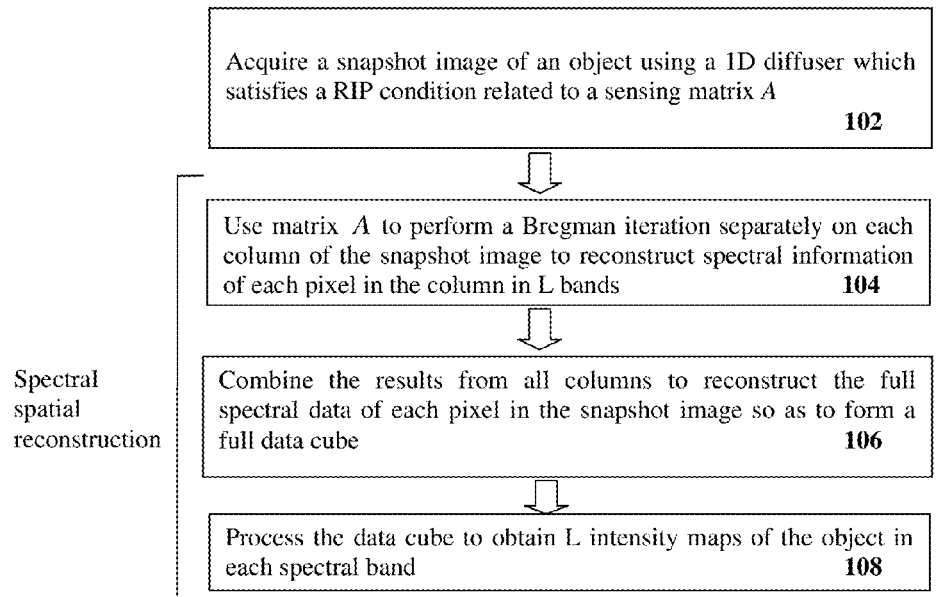
FIG. 1A shows a flow chart of an embodiment of a method for SSI disclosed herein.

The description next provides details of methods for SSI using essentially a digital camera and a RIP diffuser and various apparatus embodiments. Due to the optical properties of the RIP diffuser (see below), each pixel in a dispersed image obtained with such apparatus includes a linear mixture of spectral and spatial information from all pixels of a corresponding column in the dispersed image. For the reconstruction of the full spectral cube, each pixel of the dispersed image can be thought of as a linear equation with ML variables. Since there are MN equations and a total of MNL variables, this problem seems underdetermined. However, CS theory suggests a method to capture and represent compressible images at a rate significantly below the Nyquist rate, by exploiting the sparse nature of the image data in some mathematical basis. This may be done using non-adaptive linear projections which enable full reconstruction of the spectral cube of the source object. The full reconstruction is done using an optimization process to compensate for the underdetermined nature of the problem. The operator performing the linear projections can be described as a "sensing matrix" that has fewer rows than columns and that operates on the spectral cube to form a dispersed image. The dispersed image has fewer elements than the original source object and is formed from a smaller number of equations than the total number of variables (voxels) in the spectral cube. The spectral cube can be reconstructed, with some accuracy, from the dispersed image by an iterative digital processing algorithm.

The reconstruction process guarantees full reconstruction of the source object if the sensing matrix satisfies a RIP condition. The RIP condition is expressed in Eq. (21) below. A RIP diffuser is designed so that the transfer function of the optical imaging system (which is identical with the sensing matrix) including the diffuser satisfies the RIP condition at each single wavelength (or at a band chosen around the single wavelength). Put differently, a RIP diffuser is a diffuser which obeys a mathematical RIP condition with a block-sensing matrix of the optical system, wherein each block of the block-sensing matrix corresponds to a single wavelength (or a band chosen around the single wavelength) in a spectral range of interest. In some embodiments, the block-sensing matrix may be of Toeplitz type. In particular, the RIP diffuser modifies a point spread function (PSF) of an imaging optical system at each wavelength, such that the resulting linear transform of the source object to a dispersed image satisfies the RIP condition, as required in compressed sensing based reconstruction, The RIP diffuser may be an optical element with a 1D or 2D random phase transmission function, amplitude transmission function or a combination thereof.

Due to the compressibility property of the source object, this object can be represented in a space in which it is sparse. The sparse representation of the source object can be reconstructed from the dispersed image by performing minimization with respect to a $L_1$ difference criterion between a reconstructed sparse vector of the source object multiplied by the sensing matrix and the dispersed image. The $L_1$ minimization process (with the constraint) can be exemplarily achieved via a linearized Bregman iteration process, see e.g. W. Yin et al., SIAM J. Imaging Sciences (hereinafter "LB"). Vol. 1(1), pp. 143-168, 2008, or via a split Bregman iteration process, see e.g. Z. Cai et al., SIAM J. Multiscale Modeling and Simulation, Vol. 8(2), pp. 337-369, 2009 (hereinafter "SB"). Both processes have been known to be efficient tools for CS reconstruction. The Bregman iteration (linearized or split) is an iterative algorithm which involves a closed loop, with the reconstruction constrained $L_1$ error serving as the feedback to the loop, and with a shrinking operation that ensures a sparse reconstruction.

FIG. 1A shows schematically an embodiment of a method for SSI disclosed herein. In step 102, a dispersed image is obtained with an optical imaging system that includes a digital camera having an imaging lens and a pixelated image sensor, and a 1D or 2D RIP diffuser inserted in the optical path between an object and the image sensor. Optionally, the imaging system may also include a fixed 1D disperser as described in U.S. Pat. No. 8,081,244. The RIP diffuser (and optionally the disperser) may be installed between the imaging lens and the scene, between the imaging lens and the camera sensor, or as a part of (inside) the imaging lens. After determination of the block sensing matrix corresponding to the RIP diffuser formulation above, a dispersed image at the camera sensor can be linearly related to the voxels of the spectral cube. Specifically, for a 1D RIP diffuser, each column of the dispersed image is a linear combination of all spectral and spatial data in the corresponding source object column. In step 104, the sensing matrix is used to perform a Bregman iteration process which is sequentially applied to columns of the dispersed image separately, to reconstruct spectral cube information corresponding to M voxels in each of N columns and L spectral bands of the source object cube. Details are given in FIG. 1B. The result of step 104 is a set of vectors, each vector including all spectral information for every pixel in the corresponding image column. In step 106, the results from all reconstructed image columns from step 104 are placed next to each other, thereby providing the entire spectral information for every pixel in the dispersed image. The result of step 106 is the reconstruction of a matrix X' defined in Eq. (1) below and which represents the full spectral cube. Finally, in step 108, the spectral cube is processed to obtain L separate spectral images of the object, i.e. each consecutive set of M rows in X' is taken to form the spectral image of that set's corresponding spectral band.

Figure 1B:
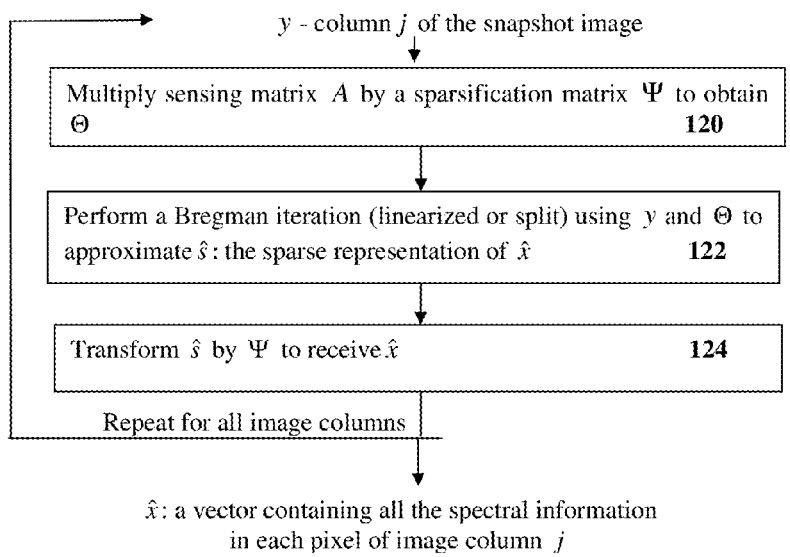
FIG. 1B shows details of step 104 in the flow chart of FIG. 1.

FIG. 1B shows details of step 104. It describes the process that each column j, which is taken from the sensor that contains the snapshot image, goes through. In step 120, the measurement (sensing) matrix A is multiplied by either a wavelet matrix or a framelet matrix $\Psi$ to sparsity the sensing matrix. This yields a new sensing matrix $\Theta$. A linearized or split Bregman iteration using column j of the snapshot image (represented by a vector y) and $\Theta$ is performed in step 122 to approximate a vector ŝ. In step 124, ŝ is then transformed by $\Psi$ to obtain x, a vector which includes all spectral information in each pixel of the column.

Figure 1C:
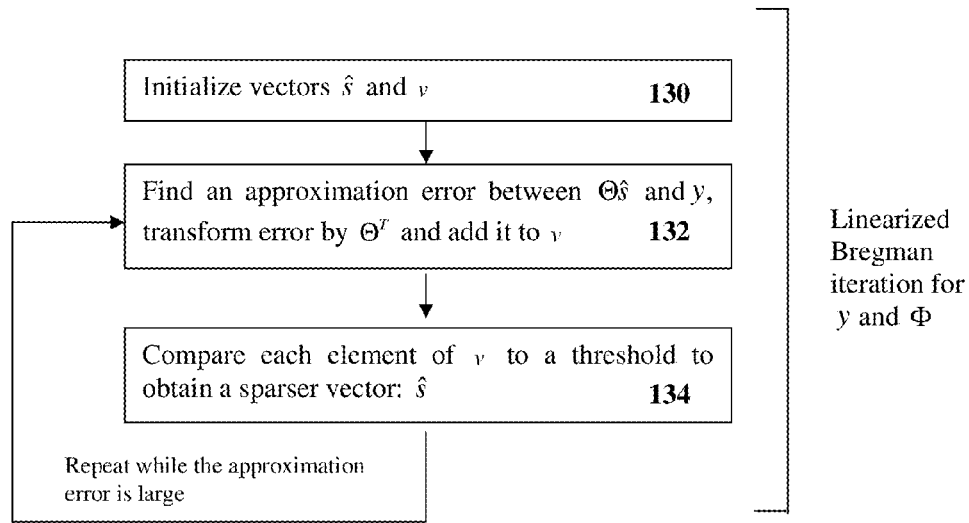
FIG. 1C shows details of step 122 in the flow chart of FIG. 1B for linearized Bregman iterations.

FIG. 1C shows details of step 122 for a linearized Bregman iteration as described in LB. Vectors ŝ and v are initialized in step 130. An approximation error between $\Theta$ŝ and y is found, and this approximation error is transformed by $\Theta^T$ and added to v (an auxiliary vector used in the Bregman iterations) in step 132. Each element of v is then compared to a threshold to obtain a more sparse vector ŝ in step 134.

Figure 1D:
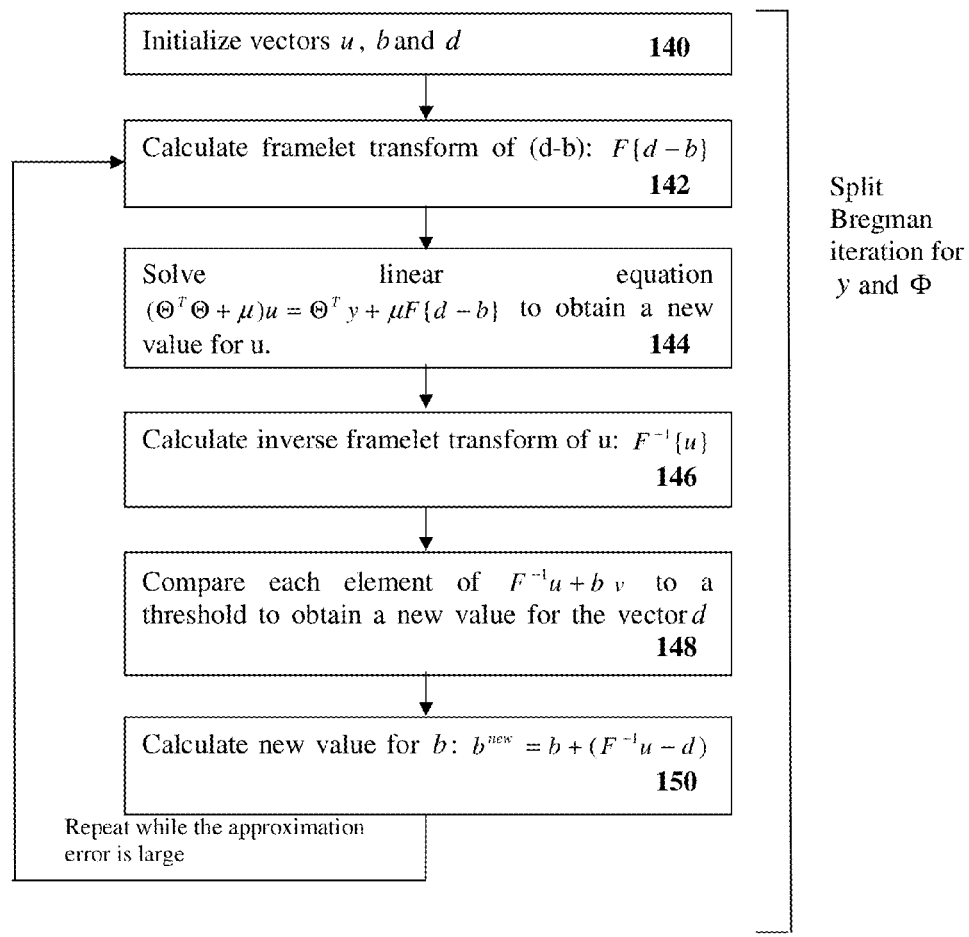
FIG. 1D shows details of step 122 in the flow chart of FIG. 1B for split Bregman iterations.

FIG. 1D shows detail of step 122 for a split Bregman iteration as described in SB. Vectors u, d and b are initialized in step 140. To sparsify the source object data, a framelet transform, wavelet transform, a combination thereof, or K-SVD is applied to d-b in step 142. Appropriate framelet transforms may be found in A. Averbuch, P. Neittaanmaki and V. Zheludev, "Periodic discrete-time frames: Design and application for image processing", submitted to the SIAM J. on Imaging Sciences, 2012, and in A. Averbuch, P. Neittaanmaki and V. Zheludev, "Spline-based frames in the space of periodic signals", submitted to Inverse Problems and Imaging, 2012. A linear equation is then solved to find a new value for vector u in step 144. An inverse framelet transform $F^{-1}\{u\}$ of u is calculated in step 146. Each element of $F^{-1}u+bv$ is compared to a threshold to obtain a new value for vector d in step 148. A new value for b is then calculated as $b^{new}=b+(F^{-1}u-d)$ in step 150.

Diffuser Design Formulation

The spectral cube 3D matrix is considered as a set of 2D spectral images in two spatial dimensions expressed by L matrices with size M×N, each of a different spectral band ($\lambda_1$, 1≤i≤L). Next, a 2D matrix X of size ML×N, created by placing the L spectral images one on top of the other, is defined such that $$X = \begin{pmatrix} \begin{pmatrix} X_{1,1,1} & \cdots & X_{1,N,1} \\ \vdots & & \vdots \\ X_{M,1,1} & \cdots & X_{M,N,1} \end{pmatrix} \}\lambda_1 \\ \begin{pmatrix} X_{1,1,2} & \cdots & X_{1,N,2} \\ \vdots & & \vdots \\ X_{M,1,2} & \cdots & X_{M,N,2} \end{pmatrix} \}\lambda_2 \\ \vdots \\ \begin{pmatrix} X_{1,1,L} & \cdots & X_{1,N,L} \\ \vdots & & \vdots \\ X_{M,1,L} & \cdots & X_{M,N,L} \end{pmatrix} \}\lambda_L \end{pmatrix} \quad (1)$$

where $X_{m,j,i}$ is a voxel of the spectral cube corresponding to the spatial pixel positioned in row number m, 1≤m≤M, in column number j, 1≤j≤N and in a wavelength range number i, 1≤i≤L. This matrix can be vectorized in different ways. Consider a 1D dispersion that does not provide a mix between the first and second spatial dimensions of X. Therefore, each column of X $$x^j = \begin{pmatrix} X_{1,j,1} \\ \vdots \\ X_{M,j,1} \\ X_{1,j,2} \\ \vdots \\ X_{M,j,2} \\ \vdots \\ X_{1,j,L} \\ \vdots \\ X_{M,j,L} \end{pmatrix}, \quad 1 \le j \le N. \quad (2)$$

is treated separately. The imaging at spectral band $\lambda_i$ of a light intensity pattern $I_{\lambda_i}$ with pixels from the source object through an incoherent optical imaging system, i.e. one comprising a RIP diffuser, can be modeled mathematically by a convolution between the image intensity and the impulse response of the diffuser (for each spectral band $\lambda_i$ separately) such that the polychromatic image intensity is:

$$I' = \sum_{\lambda_i} c_{\lambda_i} I'_{\lambda_i} \qquad (3)$$

where I' characterizes the dispersed image formed on the image sensor and $I_{\lambda_i}$ characterizes the cross section of the spectral cube of the object or image intensity in spectral band $\lambda_i$ with the same size of matrices characterizing I' and $I_{\lambda_i} \cdot c_{\lambda_i}$ are coefficients of spectral sensitivity of the image sensor in spectral ranges. The function $I'_{\lambda_i}$ of the dispersed image intensity is a 2D linear transformation calculated with respect to index m, $1 \le m \le M$ corresponding to spatial coordinates as $$I'_{\lambda_i,m',j'} = \sum_{j=1}^{N}\sum_{m=1}^{M} h_{\lambda_i,m',m,j',j} I_{\lambda_i,m,j} \qquad (4a)$$

or approximately with 1D linear transformation $$I'_{\lambda_i,m'} = \sum_{m=1}^{M} h_{\lambda_i,m',m} I_{\lambda_i,m} \qquad (4b)$$

where $h_{\lambda_i}$ is the incoherent point spread function (PSF) or impulse response. For a spatially variant incoherent optical system, the linear transformation becomes a convolution operation $$I'_{\lambda_i} = I_{so_i} \otimes h_{\lambda_i} \qquad (5)$$

Note that the values required for the mathematical algorithm may be positive or negative, whereas optical implementation as an intensity response naturally leads to positive values only. Accordingly, instead of $h_{\lambda_i,m',m,j',j}$, an impulse response $h_{\lambda_i,m',m,j',j} + \bar{h}_{\lambda_i}$ with a constant addition $\bar{h}_{\lambda_i}$ (DC) can be implemented, leading to an additional DC-related term in the dispersed image intensity. To evaluate and subtract the DC-related term, one has to consider, in addition to the dispersed image, a regular (non-dispersed) image, and execute digital processing of both regular and dispersed images. In particular, the digital processing subtracts the sums such that $$I'_{\lambda_i,m',j'} = \sum_{j=1}^{N}\sum_{m=1}^{M}(h_{\lambda_i,m',m,j',j}+\bar{h}_{\lambda_i})I_{\lambda_i,m,j} - \bar{h}_{\lambda_i}\sum_{j=1}^{N}\sum_{m=1}^{M}I_{\lambda_i,m,j}. \qquad (6)$$

The camera sensor summarizes spectrally the intensity in each pixel with spectral weights $c_{\lambda_i}$ such that to provide the dispersed image as a subtraction of positive PSFs $$I'_{m',j'} = \sum_{\lambda_i} c_{\lambda_i} I'^{(i)}_{\lambda_i,m',j'} = \qquad (7)$$

$$\sum_{\lambda_i} c_{\lambda_i} \sum_{j=1}^{N}\sum_{m=1}^{M}(h_{\lambda_i,m',m,j',j}+\bar{h}_{\lambda_i})I_{\lambda_i,m,j} - \sum_{\lambda_i} c_{\lambda_i}\bar{h}_{\lambda_i}\sum_{j=1}^{N}\sum_{m=1}^{M} I_{\lambda_i,m,j}.$$

Finally $$I'_{m',j'} = \sum_{\lambda_i} c_{\lambda_i} \sum_{j=1}^{N}\sum_{m=1}^{M} h_{\lambda_i,m',m,j',j} I_{\lambda_i,m,j}. \qquad (8a)$$

or approximately with 1D linear transformation $$I'_{m',j'} = \sum_{\lambda_i} c_{\lambda_i} \sum_{m=1}^{M} h_{\lambda_i,m',m} I_{\lambda_i,m}. \qquad (8b)$$

For a spatially invariant incoherent optical system, the matrix of the linear transformation in Eqs. (8a) and (8b) for each spectral band $\lambda_i$ is Toeplitz, i.e. $h_{\lambda_i,m',m,j,j'} = h_{\lambda_i,m'-m,j'-j}$ and $h_{\lambda_i,m',m} = h_{\lambda_i,m'-m}$ respectively.

Assuming that the RIP diffuser is designed (see below), the PSF of the incoherent imaging system $h_{\lambda_i}$ can be calculated as:

$$h_{\lambda_i} = FT\{T_{\lambda_i} * T_{\lambda_i}\} = |FT\{T_{\lambda_i}\}|^2, \qquad (9)$$

$$T_{\lambda_i} = e^{i\varphi_{\lambda_i}} \qquad (10)$$

where T is the diffuser transfer function, $\phi_{\lambda_i}$ is a random phase function of the RIP diffuser which depends on spatial coordinates, FT denotes the spatial Fourier transform and * is a symbol of the spatial autocorrelation. For a fixed column j one can define $$X_{m,j,i} = I_{\lambda_i,m,j}, Y_{m,j,\lambda_i} = I'_{\lambda_i,m,j}, \qquad (11)$$

as well as define a matrix with size M×M for the case of 1D linear transformation, Eq. (4b)

$$H_{\lambda_i} = \begin{pmatrix} h_{\lambda_i,1,1} & \cdots & h_{\lambda_i,1,M} \\ \vdots & \ddots & \vdots \\ h_{\lambda_i,M,1} & \cdots & h_{\lambda_i,M,M} \end{pmatrix} \qquad (12)$$

By re-writing Eq. (4b) in algebraic matrix form and resorting to notations of Eq. (11), the convolution of Eq. (4) is turned into a matrix multiplication between Toeplitz matrix $H_{\lambda_i}$ and the vectors that represent a column j of the source and the dispersed image intensity as $$\begin{pmatrix} Y_{1,j,\lambda_i} \\ \vdots \\ Y_{M,j,\lambda_i} \end{pmatrix} = H_{\lambda_i} \begin{pmatrix} X_{1,j,\lambda_i} \\ \vdots \\ X_{M,j,\lambda_i} \end{pmatrix}. \qquad (13)$$

Note that although 1D operation Eq. (13) are used for simplicity, more general linear transformations may be considered in spatially variant optical systems, with proper generalization of the mathematical formulation. Defining vectors $$y^j = \begin{pmatrix} Y_{1,j} \\ \vdots \\ Y_{M,j} \end{pmatrix}, Y_{m,j} = I'_{\lambda_i,m}, 1 \le j \le N. \qquad (14)$$

with size M×1, and combining equations (8) and (13) yields:

$$y^j = (H_{\lambda_1} \ldots H_{\lambda_L})x^j. \qquad (15)$$

The matrix $$H=(H_{\lambda_i} \ldots H_{\lambda_L}) \quad (16)$$

is named "sensing matrix" or "measurement matrix" and is a block matrix (e.g. Toeplitz type) with size M×N' where N'=ML. Thus, H can be considered a dimension-reducing matrix which reduces the size of vector $x^j$ from N'×1 to M×1. Accordingly, Eq. (15) may be written in matrix form $$y^j = Hx^j, \quad (17)$$

which relates directly to the compressed sensing problem of reconstructing x from the samples of vector y when $$y = \Phi x, \quad (18)$$

where $\Phi$ is a dimension-reducing sensing matrix with dimensions M×N' and is equal to H. A stable solution is assured if matrix $\Phi$ (or H) satisfies the RIP condition Eq (21) below, if x is a K-sparse or compressible matrix and if M≥K. If vector x is not sparse but compressible, then it can be represented as a sparse vector in another orthonormal basis:

$$x = \psi S \quad (19)$$

where $\psi$ is a sparsifying matrix and S is a K-sparse vector. In this case:

$$y = \Phi x = \Phi \psi S = \Theta S \quad (20)$$

and the RIP condition applies to $\Theta$ where $\Theta = \Phi \psi$. The sparsifying matrices, which are used to transform an unknown image to a sparse representation, may be derived from wavelet transforms, framelet transforms or their combinations or alternatively from K-SVD matrices.

For a K sparse vector reconstruction (whose nonzero positions are known), the RIP condition requires for any vector v sharing the same K nonzero entries as S and for some small number $\delta_k > 0$, that the following inequality be satisfied:

$$(1-\delta_k)\|v\|_2 \le \|\Theta v\|_2 \le (1+\delta_k)\|v\|_2. \quad (21)$$

If the nonzero positions of S are unknown, then a sufficient condition for a stable solution for both K-sparse and compressible signals is that $\Theta$ satisfies Eq. (21) for an arbitrary 3K-sparse vector v. A related condition requires that the rows of $\Phi$ cannot sparsely represent the columns of $\psi$ (and vice versa). This condition is referred to as "incoherence in compressed sensing".

Both the RIP and the incoherence conditions can be obtained by selecting $\Phi$ as a deterministic sensing matrix built as rows of kernels of a discrete cosine transform (DCT) or a Hadamard transform. Alternatively, both the RIP and the incoherence conditions can be obtained by selecting $\Phi$ as a random matrix. Perhaps the best known random sensing matrix is formed by independent and identically distributed ("iid") random variables from a Gaussian probability density function with zero mean and with variance. Then, the columns of $\Phi$ are approximately orthonormal. Other random sensing matrices that obey the RIP condition can be formed using iid random variables with different distributions, e.g. a Bernoulli distribution. It is also known that in mathematics, Toeplitz and circulant matrices whose first row is iid Gaussian or iid Bernoulli can be used as good sensing matrices.

Returning to the model above and to Eqs. (12), (13), (17) and (18), one sees that H is in fact the sensing matrix. To enable stable reconstruction of x from y, H must obey the RIP condition Eq. (21). As H is a block Toeplitz matrix, it is enough to determine the first row and the first column of each Toeplitz block to describe full matrices as $$(h_{\lambda_i, M, 1} \ldots h_{\lambda_i, 2, 1} h_{\lambda_i, 1, 1} \ldots h_{\lambda_i, 1, M}). \quad (22)$$

Examples of such first rows can be random variable arrays with either Gaussian or Bernoulli probability distributions. Moreover, Eq. (9) states that the power spectral density (PSD) of the diffuser Eq. (10) is considered as a spatial random process. Therefore, after determining $H_{\lambda_i}$ from an iid set of random variables with e.g. a Gaussian or Bernoulli probability distribution density function, one can obtain for each $\lambda_i$ a PSD for Eq. (10) and ensure that the RIP diffuser enables a stable solution to the compressed sensing problem of restoring x from y.

Exemplary RIP Diffuser Implementation

The main mathematical requirement from the RIP diffuser is to have a transfer function of the type $T = e^{i\phi}$ with a random phase $\phi$ such that the corresponding PSD $h_{\lambda_i} = \text{FFT}\{T_{\lambda_i} * T_{\lambda_i}\}$ obeys the RIP condition. This provides the sensing matrix for the RIP algorithm. In some embodiments, the RIP diffuser is 1D. In an exemplary embodiment, a RIP diffuser fulfilling this requirement is designed as a thin optical diffractive element with a randomly selected groove depth. As mentioned, a RIP diffuser implements a random phase mask such that a block Toeplitz sensing matrix satisfies the RIP condition. For the 1D case, the RIP diffuser may be designed with phase levels as in FIG. 9B below. These may be implemented as micro-relief horizontal lines, each line characterized by a width and a random groove depth h, as illustrated exemplarily in FIGS. 9C and 9D. This forms in effect a phase transmitting diffractive optical element with a groove depth h, varying along spatial coordinates x, y. Each groove depth h, causes a corresponding phase shift $$\varphi_\lambda = \frac{2\pi h[n(\lambda) - 1]}{\lambda} \quad (23)$$

determining the phase function, where n($\lambda$) is the refractive index. Since the phase is wavelength-dependent, each groove depth adds a different phase to light with a different wavelength. The relation between the phase additions for two different wavelengths is given by $$\frac{\varphi_{\lambda_1}}{\varphi_{\lambda_2}} = \frac{\lambda_2}{\lambda_1} \frac{n(\lambda_1) - 1}{n(\lambda_2) - 1} \cong \frac{\lambda_2}{\lambda_1}. \quad (24)$$

The last approximation in Eq. (24) can be applied because n varies slowly with wavelength. Therefore, if the grooves of the mask are designed for a specific wavelength $\lambda_{des}$, its impact on light with wavelength $\lambda$ is $$\varphi_\lambda = \varphi_{\lambda_{des}} \frac{\lambda_{des}}{\lambda} \frac{n(\lambda) - 1}{n(\lambda_{des}) - 1} \cong \frac{\lambda_{des}}{\lambda}. \quad (25)$$

Finally, the complex transmission function T of the diffuser is given by:

$$T(y', \lambda) = \exp(i\varphi_\lambda) = \exp\left\{i\frac{\lambda_{des}}{\lambda} \frac{n(\lambda) - 1}{n(\lambda_{des}) - 1} \frac{2\pi h(y')[n(\lambda_{des}) - 1]}{\lambda_{des}}\right\} \quad (26)$$

where y' is the 1D coordinate at the diffuser's plane. In particular, in a case when the phase is piece-wise constant (i.e. constant for each resolution step), there is a discrete version $$T(y', \lambda) = \exp\left(i\frac{\lambda_{des}}{\lambda}\frac{n(\lambda)-1}{n(\lambda_{des})-1}\frac{2\pi h_m[n(\lambda_{des})-1]}{\lambda_{des}}\right) \qquad (27)$$

where m is the index of a vertical line on the mask and $h_m$ is the corresponding random depth of the diffuser micro-relief profile. This transfer function is designed such that it meets the above mentioned requirement to allow reconstruction of spectral data.

Note that the RIP diffuser performance depends strongly on the wavelength. Accordingly, the diffuser works as a random dispersing element, with the dispersed image being essentially a diffusely-dispersed image.

Apparatus Embodiments

Figure 2A:
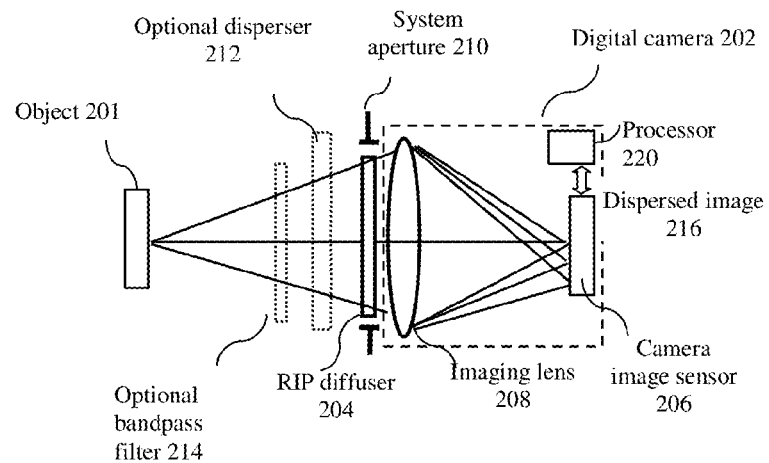
FIG. 2A shows an embodiment of a snapshot spectral imager disclosed herein that includes a digital camera and a RIP diffuser.

FIG. 2A shows schematically an embodiment 200 of a snapshot spectral imager disclosed herein. Imager 200 includes a digital camera 202 and a RIP diffuser 204. The digital camera may be any known camera, for example a SLR camera, a video camera, a cell-phone camera or a miniaturized camera of the type used in gastroscopy or endoscopy. In an embodiment, the RIP diffuser may be one-dimensional (1D), see design below. In the embodiment shown, the RIP diffuser is inserted in an optical path between a source object 201 and an image sensor 206. For simplicity, all source objects in the following embodiments are marked with, and referred to by the same number, 201. Imager 200 further includes an imaging lens 208, a system aperture diaphragm 210, and, optionally, a 1D (or 2D) disperser 212 and a band-pass spectral filter 214. The image sensor provides a dispersed image 216. The RIP diffuser, (and optionally the disperser), may be positioned at the plane of the system aperture diaphragm. Such positioning allows the diffuser to function in an essentially plane light-wave mode, which minimizes inherent aberrations and improves image quality. In an embodiment, the RIP diffuser may be part of a lens block and placed inside the camera. In another embodiment, the RIP diffuser may be placed outside the digital camera, between the camera lens and the object. In yet another embodiment, the RIP diffuser may be placed inside the digital camera lens, between the lens and the image sensor. The design of the component lenses may be matched with the light dispersing properties of the diffuser (and, if present, of the disperser). The processing of the dispersed image and other information is performed by a processor 220, which may be integrated in the digital camera or may be external to the camera. A processor exists in all apparatus embodiments in FIGS. 2b and 3-7, but is not shown for simplicity. Since miniaturized digital cameras are known and since the RIP diffuser may be made in the form of a thin diffusive-diffractive optical element, an imager such as imager 200 can clearly be miniaturized, for example for use in a diagnostic pill.

Figure 2B:
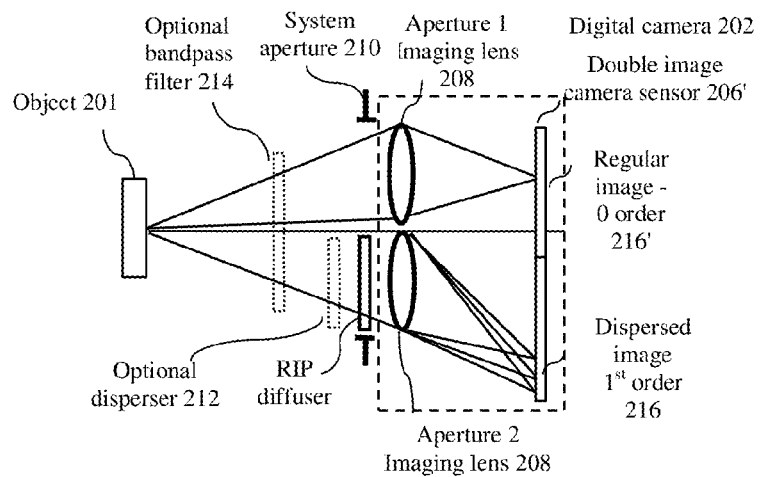
FIG. 2B shows another embodiment of a snapshot spectral imager disclosed herein that includes a double aperture digital camera and a RIP diffuser.

FIG. 2B shows schematically another embodiment 200' of a snapshot spectral imager disclosed herein. Similar to imager 200, imager 200' includes a digital camera 202' and a RIP diffuser 204, except that camera 202' is a double-aperture camera that includes two apertures for imaging lenses 208 instead of single system aperture 210. Accordingly, image sensor 206 is replaced by a double-image sensor 206', which captures both a regular image 216' and a dispersed image 216. In other embodiments, there may be more than two apertures. In general, an apparatus disclosed herein may also use designs with two optical paths leading to a single image sensor, see e.g. U.S. patent application No. 2007/0285554. One path may pass through a RIP diffuser to produce a dispersed image, while the other passes directly to the image sensor to provide a regular image.

FIGS. 3-6 show optical schemes of snapshot spectral imagers disclosed herein and including two-channels of imaging: one with a RIP diffuser and one with regular imaging as in a digital camera. All following embodiments provide both a dispersed image and a regular image. The two images are subtracted, when necessary, for implementation of a negative-valued sensing matrix in incoherent optical imaging systems.

Figure 3:
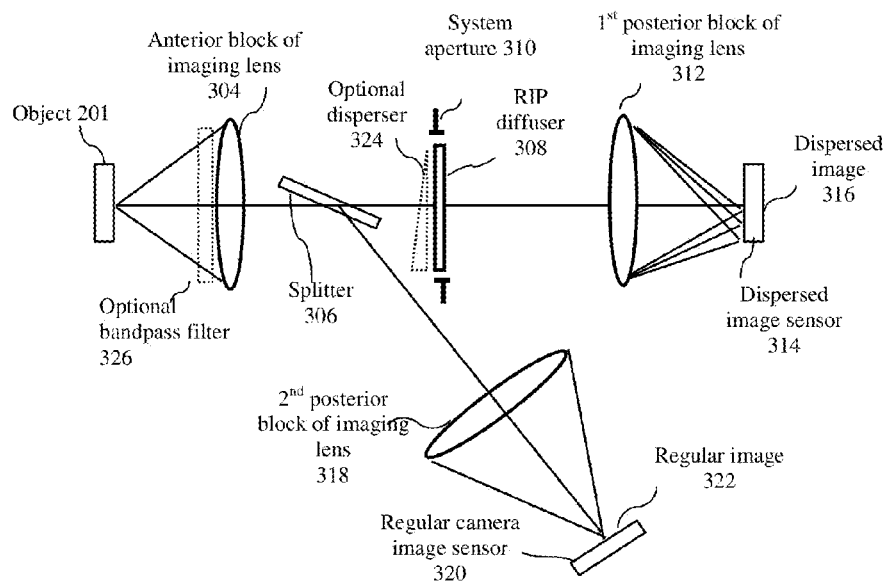
FIG. 3 shows schematically another embodiment of a spectral imaging apparatus disclosed herein and including a RIP diffuser.

FIG. 3 shows schematically another embodiment 300 of a snapshot spectral imager disclosed herein. This embodiment includes a reflective-refractive beam splitter and two separate image sensors. Imager 300 includes an anterior block of imaging lens 304, a beam splitter 306, a RIP diffuser 308, a system aperture diaphragm 310, a $1^{st}$ posterior block of imaging lens 312, a dispersed image sensor 314 for providing a dispersed image 316, a $2^{nd}$ posterior block of imaging lens 318, and a regular image sensor 320 for providing a regular (non-dispersed) image 322. Optionally, imager 300 may include a 1D (or 2D) disperser 324 and a band-pass spectral filter 326. Splitter 306 may be a semi-transparent mirror or beam splitting cube, oriented at an angle larger than 45 degrees to the optical axis, such as to reflect light to lens 318. The RIP diffuser, (and optionally the disperser), are placed preferably at the plane of system aperture diaphragm 310. The design of the lenses is matched with the light dispersing properties of the diffuser and disperser.

Figure 4:
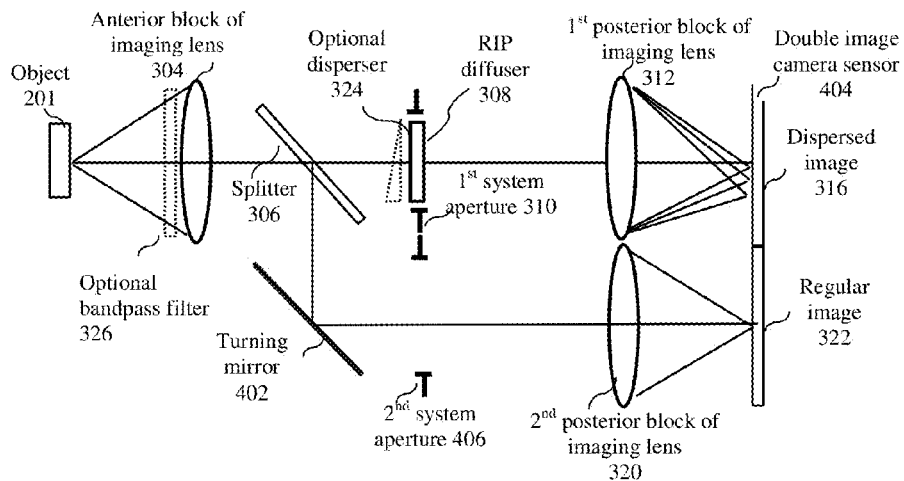
FIG. 4 shows schematically yet another embodiment of a spectral imaging apparatus disclosed herein and including a RIP diffuser.

FIG. 4 shows schematically yet another embodiment 400 of a snapshot spectral imager disclosed herein. Imager 400 differs from imager 300 in that it includes an added turning mirror 402, a double image sensor 404 that captures both dispersed and regular images, and a second system aperture 406. Here, splitter 306 is oriented at an angle close to 45 degrees to the optical axis, such as to reflect light to turning mirror 402. The double-image sensor is obtained by aligning the dispersed and regular image sensors.

Figure 5:
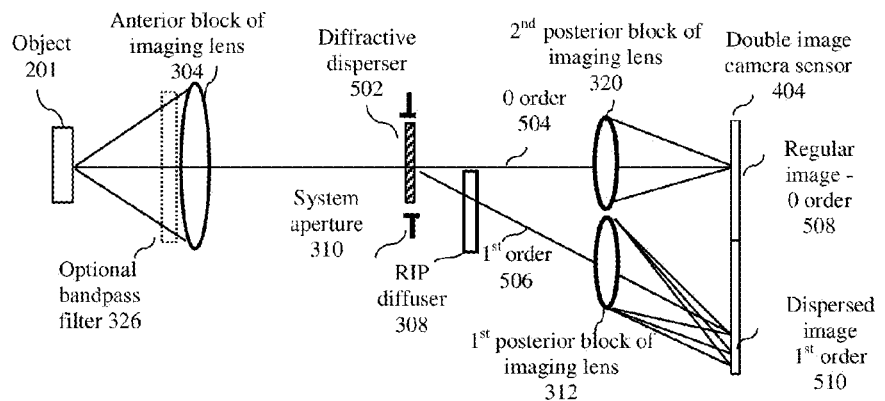
FIG. 5 shows schematically yet another embodiment of a spectral imaging apparatus disclosed herein and including a RIP diffuser.

FIG. 5 shows schematically yet another embodiment 500 of a snapshot spectral imager disclosed herein. Imager 500 differs from imagers 300 and 400 in that it includes a diffractive disperser 502 that serves as both beam splitter and 1D disperser. Also included is a double image sensor as in FIG. 4. Diffractive disperser 502 may be implemented as a diffraction grating which splits light to 0 and $1^{st}$ diffraction orders 504 and 506, where the 0 order has no dispersion and forms a regular image 508 and where the $1^{st}$ order has dispersion and forms a dispersed image 510 on the double image sensor.

Figure 6:
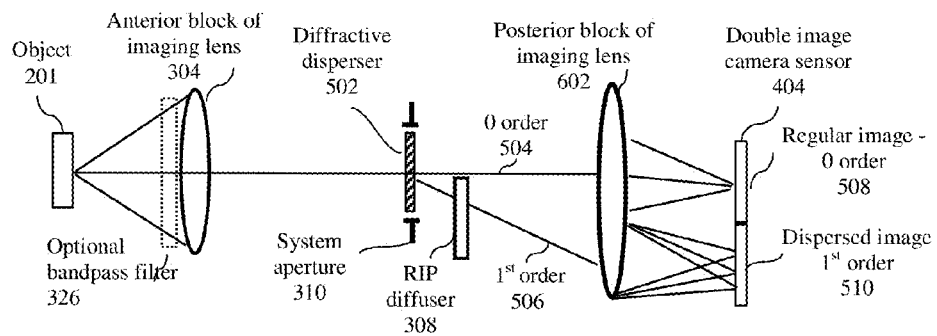
FIG. 6 shows schematically yet another embodiment of a spectral imaging apparatus disclosed herein and including a RIP diffuser.

FIG. 6 shows schematically yet another embodiment 600 of a snapshot spectral imager disclosed herein. Imager 600 includes a diffractive disperser 502 as in FIG. 5, but has a single posterior block 602 instead of two separate posterior blocks of imaging lenses 314 and 520. Anterior block 304 and system aperture diaphragm 310 are packaged with $1^{st}$ posterior blocks 312 and 320 to form the imaging lens. In some embodiments, either the anterior block or posterior block(s) of the imaging lens may be missing, such that the imaging lens is formed solely by the posterior block(s) or solely by the anterior block, respectively. RIP diffuser 308 and (if present) disperser 312 are preferably spatially located closer to the system aperture (or entrance or exit pupil of the imaging lens) than to the image sensor.

In use in one of the embodiments of imagers 300-600, a source object is illuminated with white light or radiates its own light. The light from the object passes through the optional band-pass filter, is collected by the anterior block of the imaging lens and passes through the system aperture diaphragm, is split to two beams by the splitter (or alternatively by the diffractive disperser). The light is then spectrally dispersed by the RIP diffuser and, optionally, by the disperser. Alternatively the light is spectrally dispersed by the diffractive disperser One of the two split beams passes through the RIP diffuser and is imaged by the $2^{nd}$ posterior block (or alternatively by the common posterior block) of the imaging lens to the dispersed image sensor (or to the double sensor), thereby providing a dispersed image on the dispersed image sensor. The other beam is imaged by the $1^{st}$ posterior block (or alternatively by the common posterior block) of the imaging lens to the regular image sensor (or to the double sensor), thereby providing a regular image. The optional band-pass filter may be used in some embodiments to filter unwanted sections of the spectrum. The light is dispersed by a joint operation of RIP diffuser 208 and optional disperser 212 or 230 and into a number of spectral bands that are mixed at each detector pixel as described above. The mixed spectrum is unmixed further by digital image processing as described above to obtain a spectral cube. The data may be further processed to obtain the necessary separate spectral and spatial information (i.e. spectral images).

The optical schemes of snapshot spectral imagers disclosed herein and including two-channels of imaging may be implemented by resorting to conventional SLR digital cameras with a jumping mirror, switching the image either to the main image sensor or to the eyepiece image sensor. Alternatively, they may be implemented by resorting to conventional digital cameras with a digital eyepiece. In both cases, the eyepiece channel may be used as a channel for the regular image, whereas the main image channel may be equipped with the RIP diffuser and optional disperser.

Computer Simulations

Computer simulations were run to test various aspects of the algorithm and to simulate the entire snapshot spectral imaging process. A first simulation relates to a proof of some mathematical aspects of the CS algorithm expressed by equations above. A second simulation relates to a combination of the random Toeplitz matrix with a Bregman CS algorithm. A third simulation provides proof of the spectral cube reconstruction for test source objects, when the reconstruction error can be estimated. In exemplary embodiments using random dispersion provided by the 1D RIP diffuser image columns are independent of each other, and the proposed algorithm operates on each column separately.

Simulation of Mathematical Aspects in the Use of CS Algorithms

Figure 7A:
FIG. 7A shows a gray level version of a 3-wavelength source object used in a simulation.
Figure 7B:
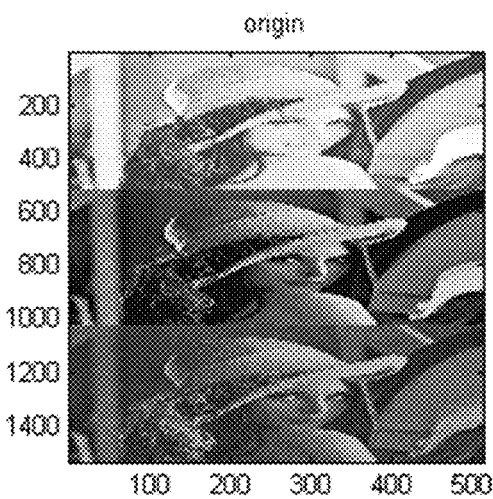
FIG. 7B shows the source object of FIG. 7A separately for R, G and B bands.
Figure 7C:
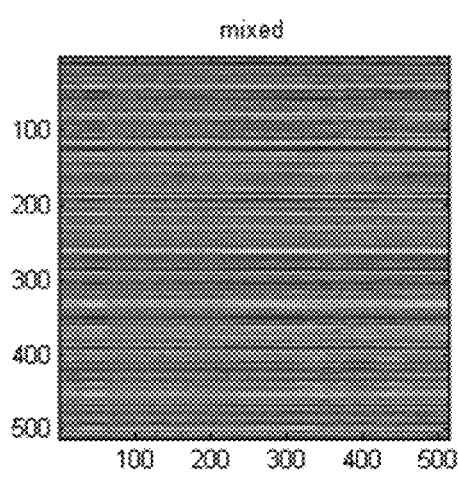
FIG. 7C shows a snapshot dispersed image on the camera sensor detector.
Figure 7D:
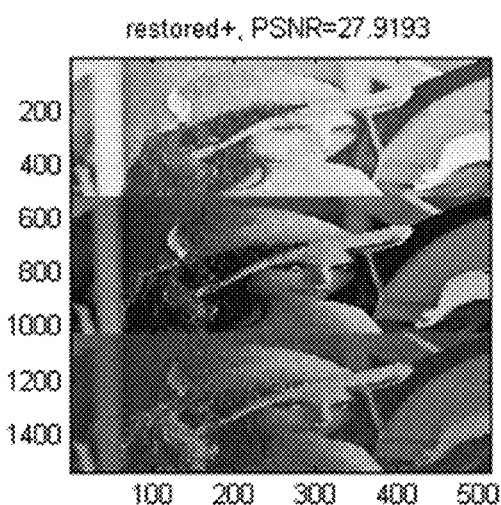
FIG. 7D shows a reconstructed image in each spectral band.

FIG. 7A shows a gray-level version of a 3-wavelength colored source object used in this simulation. The source is object 512×512×3 pixels. FIG. 7B shows the source object of FIG. 7A separately for each of three wavelength bands of R(ed), G(reen) and B(lue), each with size 512×512 pixels. These R, G, and B matrices were merged with each other along the columns to form one combined matrix of size 1536× 512, denoted by C (FIG. 7B). To simulate a model dispersed image on the detector, matrix C was multiplied by a random Gaussian matrix G of size 512×1536 to form a mixed matrix M=GC of size 512×512, which is displayed in FIG. 7C.

Figure 7E:
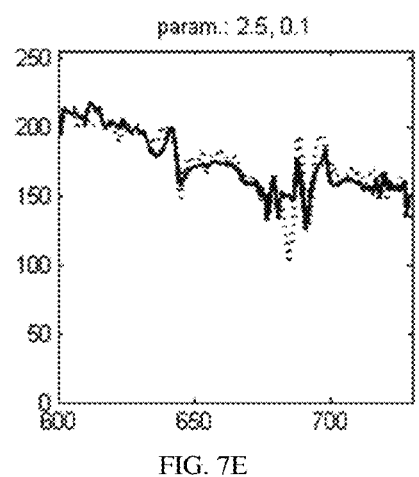
FIG. 7E shows in a graph sample cross sections along a column of the source object and its reconstruction.
Figure 7F:
FIG. 7F shows the gray level version of 3-wavelength reconstructed image, built from the images of FIG. 7D.

A framelet-based Split Bregman iteration scheme was applied to matrix M using the semi-tight wavelet frame derived from a quasi-interpolating quadratic spline. The frame decomposition was applied down to the fifth level. After 20 iterations, matrix M (FIG. 7C) was expanded into a matrix C1 of size 1536×512. Matrix C1 was split into the three separate matrices corresponding to the 3 spectral bands of size 512×512 each, to provide the reconstruction results at each spectral band, FIG. 7D. FIG. 7E shows in a graph sample cross sections along a column of the source object and its reconstruction. Specifically, one column from matrix C1 taken from FIG. 7D (solid line in FIG. 7E), was compared with the respective column in the original source object matrix C, taken from FIG. 7B (dotted line in FIG. 7E), to see the difference between the source object and its reconstruction. A PSNR was calculated to characterize the accuracy in image reconstruction and found to be 27.9 dB. This confirms the high accuracy of the Bregman iterative method as applied to spectral imaging, for the special case of three wavelength bands. FIG. 7F shows the gray level version of the 3-wavelength reconstructed image built from images of FIG. 7D and demonstrates the good overall visual reconstruction accuracy.

Figure 8A:
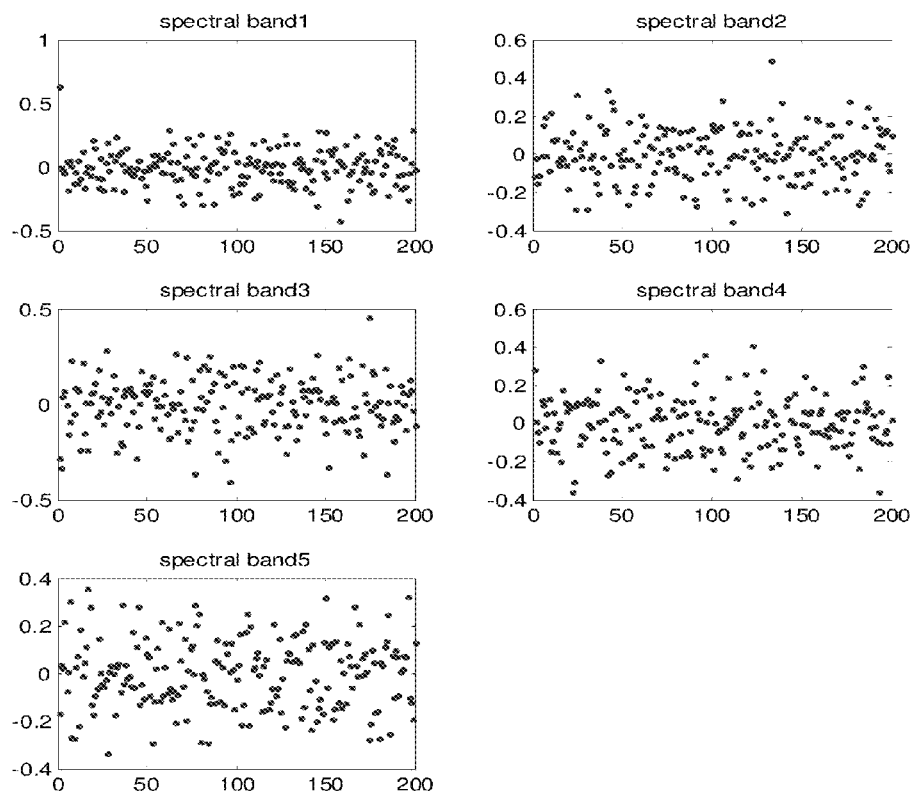
FIG. 8A shows graphs of a column of the source object separately in each of 5 spectral bands, for a simulation using a Bregman method.
Figure 8B:
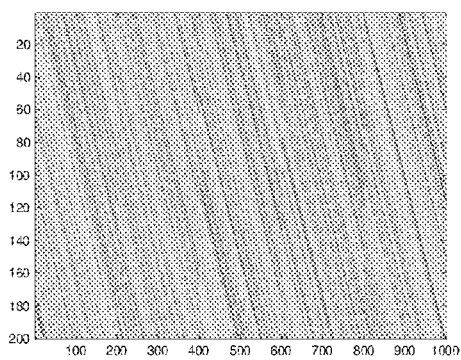
FIG. 8B shows a block Toeplitz random sensing matrix.
Figure 8C:
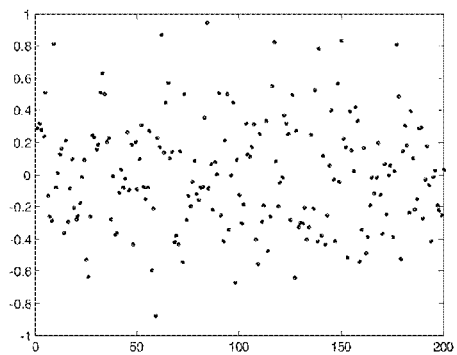
FIG. 8C shows a graph of a column of a sensor image formed with the sensing matrix of FIG. 8B from the source object of FIG. 8A.
Figure 8D:
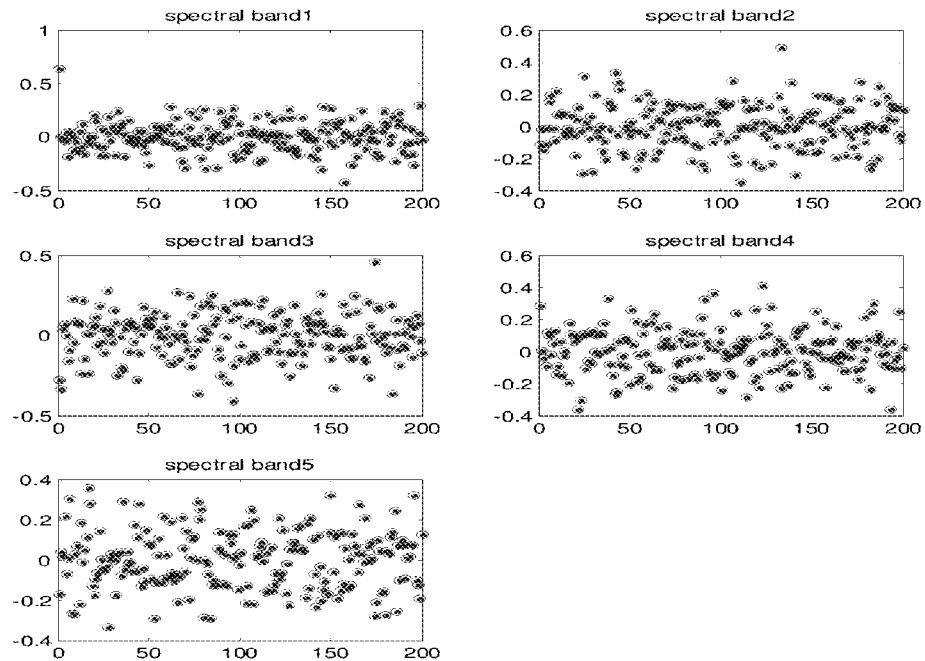
FIG. 8D shows graphs of reconstructed images, obtained by applying linearized Bregman iterations to the image of FIG. 8C.
Figure 8E:
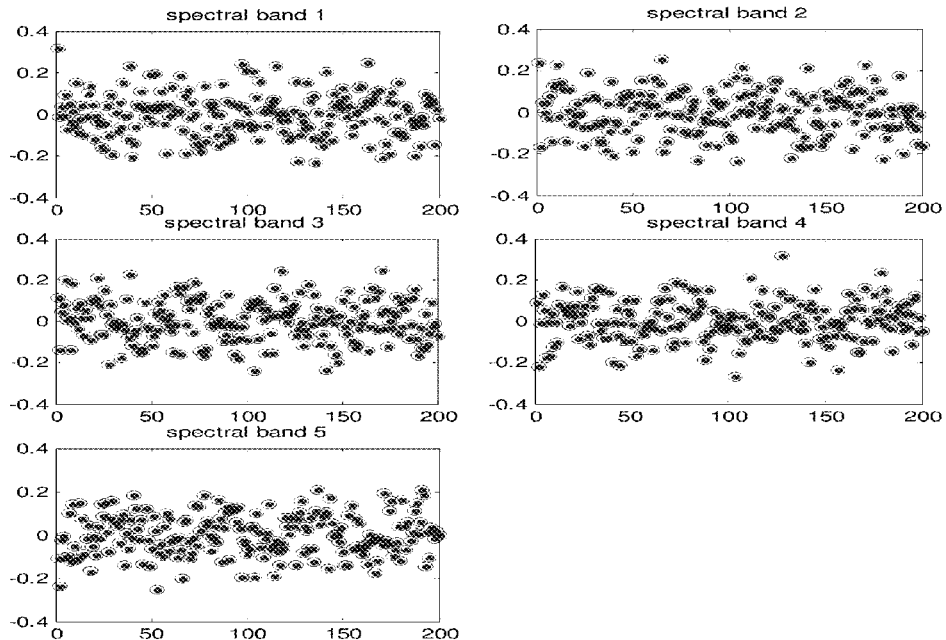
FIG. 8E shows graphs of reconstructed images, obtained by applying split Bregman iterations to the image of FIG. 8C.

Simulation for Combination of a Random Toeplitz Matrix with a Bregman CS Algorithm FIG. 8A shows graphs in each of five spectral bands of a single column of a random source object, used for checking convergence of Bergman iterations. The single column includes M=200 pixels and has a sparse representation in a discrete cosine transform (DCT) base function, so the sparsity transform matrix used in the process is a DCT matrix. The sensing matrix, shown in FIG. 8B, is a block random Toeplitz sensing matrix whose first row and column are chosen to be random iid with a Gaussian distribution function with zero mean and variance 1/M. FIG. 8C shows a graph of a column of the dispersed image formed with the sensing matrix of FIG. 8B from the source object of FIG. 8A. FIG. 8D shows graphs of the reconstructed images (ring markers) at each of 5 spectral bands, obtained by applying linearized Bregman iterations to the dispersed image of FIG. 8C. Point markers show the source object of FIG. 8A, for comparison. FIG. 8E shows graphs of the reconstructed images (ring markers) at each of 5 spectral bands, obtained by applying split Bregman iterations to the dispersed image of FIG. 8C. Point markers show the source object of FIG. 8A, for comparison. Perfect reconstruction is achieved with either Bregman method. In each figure except 8B, the horizontal axis represents pixel number and the vertical axis represents pixel value. In FIG. 8B, the horizontal axis represents matrix column numbers and the vertical axis represents matrix row numbers.

Figure 9A:
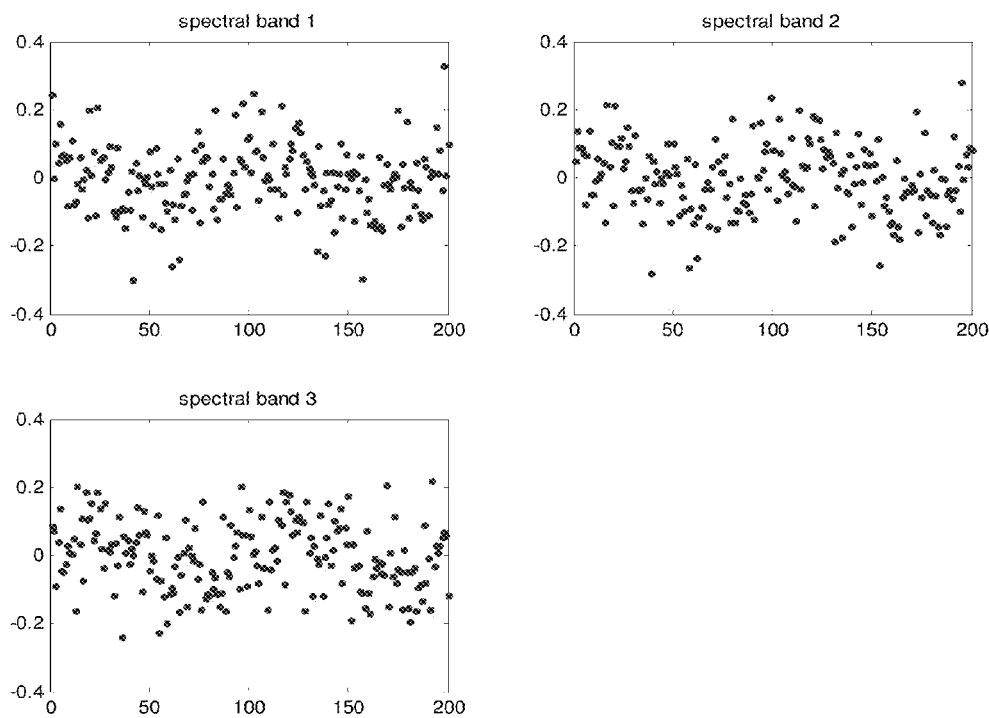
FIG. 9A shows graphs of a column of a source object separately in each of 3 spectral bands for a computer simulation of spectral cube reconstruction for test source objects sensed with a digital camera and a 1D RIP diffuser.
Figure 9B:
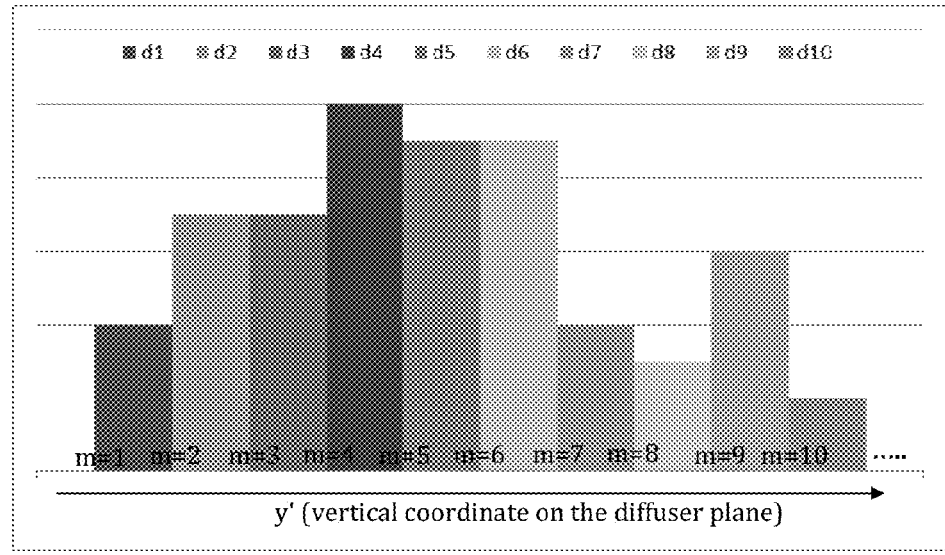
FIG. 9B shows levels of micro-relief used in the design of an exemplary 1D RIP diffuser.
Figure 9C:
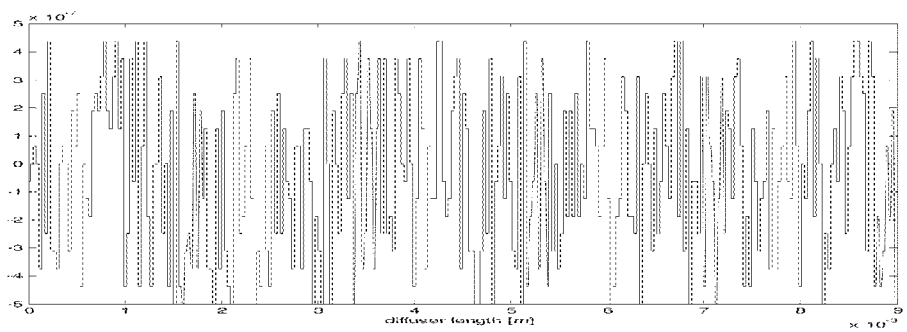
FIG. 9C shows the exemplary RIP diffuser design resorting to the levels of micro-relief shown in FIG. 9B.
Figure 9D:
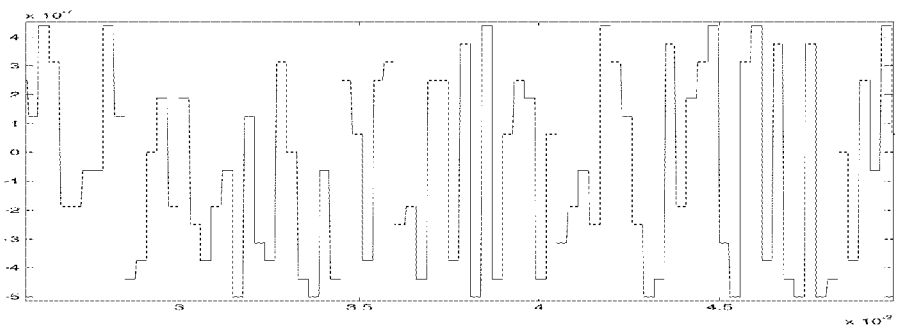
FIG. 9D shows a fragment of the RIP diffuser design of FIG. 9C.
Figure 9E:
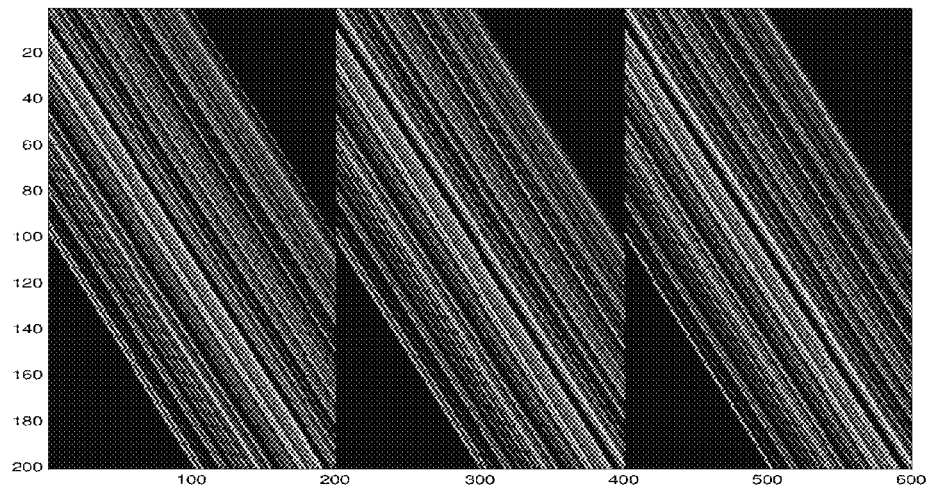
FIG. 9E shows a block Toeplitz random sensing matrix calculated using the 1D RIP diffuser of FIG. 9C.
Figure 9F:
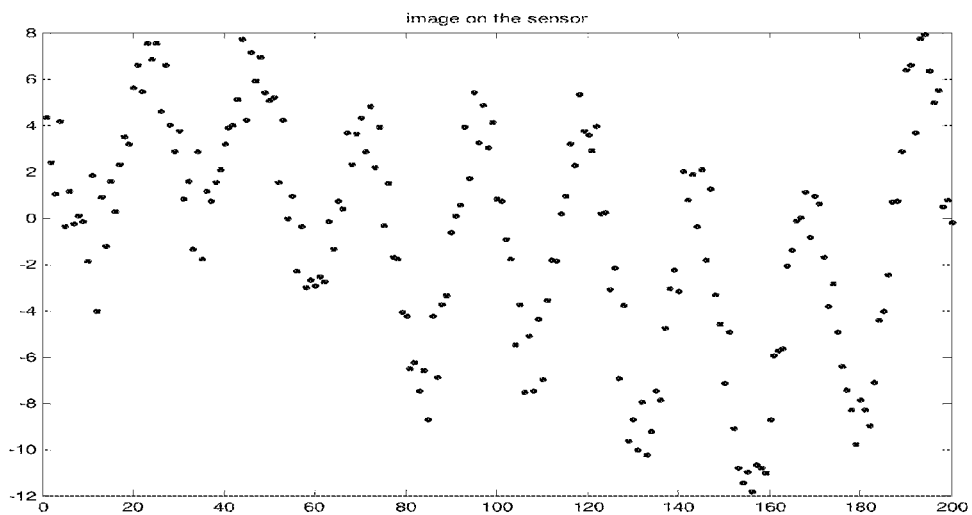
FIG. 9F shows a graph of a column of a detector image formed with the sensing matrix of FIG. 9E from the source object of FIG. 9A.
Figure 9G:
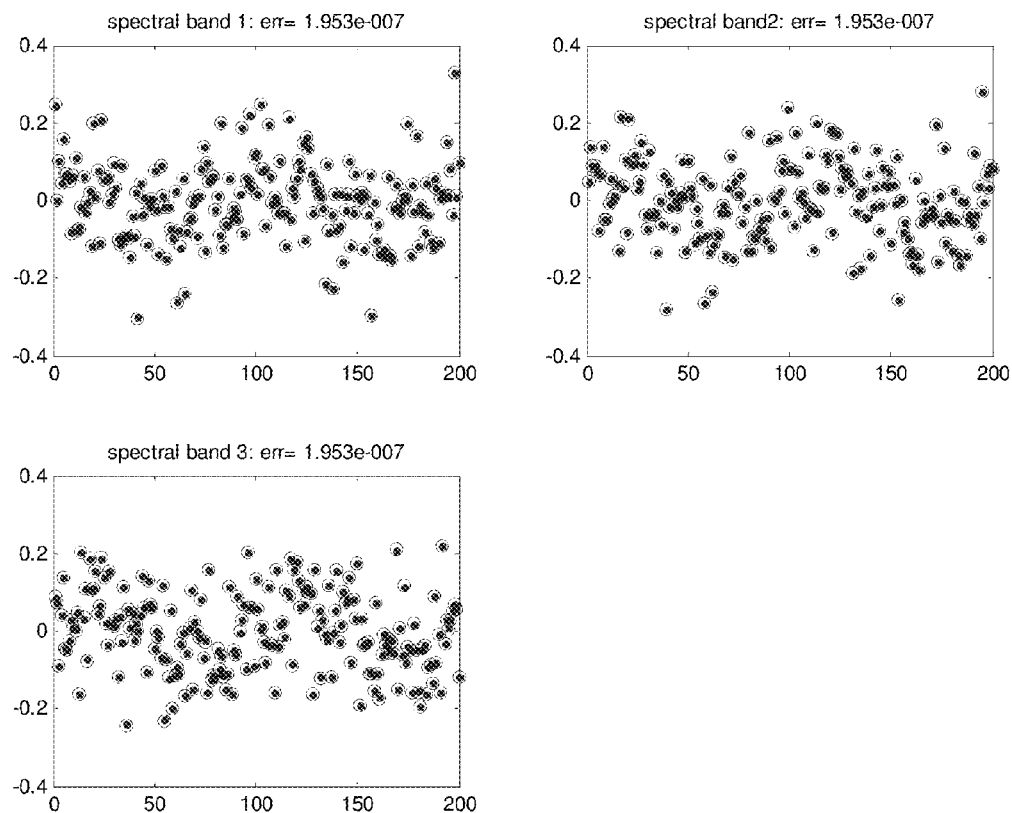
FIG. 9G shows the graphs of the reconstructed images, obtained by applying linearized Bregman iterations to the image of FIG. 9F.

Simulation of Spectral Cube Reconstruction for Test Source Objects Sensed with a Digital Camera Equipped with a 1D RIP Diffuser FIG. 9A shows graphs of a single column of the source object for each of three spectral bands used in this simulation. As in FIG. 8, the single column includes M=200 pixels and has a sparse representation in a DCT base function, so the sparsity transform matrix used in the process is a DCT matrix. FIG. 9B shows a finite set of 10 discrete micro-relief levels for the RIP diffuser design. FIG. 9C shows an exemplary design incorporating these levels. Part of the design of FIG. 9C is shown in magnification in FIG. 9D. The sensing matrix, shown in FIG. 9E is a random block Toeplitz matrix, consisting of 3 sub-matrices, each corresponding to a spectral band and calculated using the 1D RIP diffuser of FIG. 9C. The rows and columns of the block Toeplitz matrix are chosen according to the optical convolution in separate spectral bands, as described in the section dedicated to the RIP diffuser design above. FIG. 9F shows a graph of a column of the dispersed image formed with the sensing matrix of FIG. 9E from the source object of FIG. 9A. FIG. 9G shows the graphs of the reconstructed images (ring markers) in each of 3 spectral bands, obtained by applying linearized Bregman iterations to the dispersed image of FIG. 9F. Point markers show the source object of FIG. 8A, for comparison. Perfect reconstruction is achieved in both cases.

It is emphasized that citation or identification of any reference in this application shall not be construed as an admission that such a reference is available or admitted as prior art. While this disclosure describes a limited number of embodiments, it will be appreciated that many variations, modifications and other applications of such embodiments may be made. For example, while the description refers specifically to a Bregman iteration for the reconstruction process, other algorithms may be used for this process. Further, while Toeplitz matrices and convolution are described in detail, more general matrices and linear transformations, corresponding to non-paraxial and spatially-variant optical systems and/or optical systems having aberrations may also be used. For example, while 1D diffusion and dispersion are described in detail, 2D diffusion and dispersion may also be used. Thus, the disclosure is to be understood as not limited to Bregman iteration and 1D diffusion/dispersion. Further, the methods disclosed herein exemplarily for three wavelength bands may remove the need for color filter arrays on digital camera image sensors. Further yet, these methods may allow reconstruction of a color image obtained with a black and white digital camera+RIP diffuser. This can be done because the algorithms described enable reconstruction of spectral information independently of the type of sensor used in the snapshot imaging. In general, the disclosure is to be understood as not limited by the specific embodiments described herein, but only by the scope of the appended claims.

What is claimed is:

1. A snapshot spectral imager for obtaining spectral images of a source object, comprising:
   a) an imaging lens;
   b) a dispersed image sensor; and
   c) a one-dimensional (1D) restricted isometry property (RIP) diffuser inserted in an optical path between the source object and the dispersed image sensor, wherein the snapshot spectral imager is configured to obtain at the dispersed image sensor a dispersed image formed through the imaging lens and the RIP diffuser, and wherein the snapshot spectral imager is further configured to process the dispersed image to provide a plurality of spectral images of the source object.

2. The imager of claim 1, wherein the imaging lens and the dispersed image sensor are included in a digital camera.

3. The imager of claim 2, wherein the RIP diffuser is internal to the digital camera.

4. The imager of claim 2, wherein the RIP diffuser is external to the digital camera.

5. The imager of claim 2, wherein the digital camera is a SLR or video camera.

6. The imager of claim 2, wherein the digital camera is a cell-phone camera.

7. The imager of claim 2, wherein the digital camera is included in a diagnostic pill.

8. The imager of claim 1, wherein the dispersed image sensor is a black and white image sensor.

9. The imager of claim 1, further comprising a regular image sensor used to obtain a regular image of the source object, the regular image processed together with the dispersed image to provide the plurality of spectral images.

10. The imager of claim 9, further comprising a disperser inserted in the optical path.

11. The imager of claim 10, wherein the disperser is a fixed 1D disperser.

12. The imager of claim 1, further comprising a processor to perform the processing of the dispersed image.

13. A method for snapshot spectral imaging of a source object, comprising the steps of:
   a) providing an imager comprising an imaging lens, a dispersed image sensor and a RIP diffuser inserted in an optical path between the source object and the dispersed image sensor;
   b) obtaining at the dispersed image sensor a dispersed image formed through the imaging lens and the RIP diffuser; and
   c) processing the dispersed image to provide a plurality of spectral images of the source object;
      wherein the RIP diffuser obeys a mathematical RIP condition with a block-sensing matrix and wherein the step of processing includes performing a Bregman iteration process which is applied sequentially and separately to columns of the dispersed image to reconstruct spectral information and obtain the spectral images.

14. The method of claim 13, further comprising the steps of
   d) providing a regular image sensor; and
   e) obtaining a regular image with the regular image sensor, wherein the dispersed and regular images are used together to provide the plurality of spectral images.

15. The method of claim 13, wherein the Bregman iteration process uses linearized Bregman iterations.

16. The method of claim 13, wherein the Bregman iteration process uses split Bregman iterations.

* * * * *